United States Patent [19]

Risley

[11] 3,852,671

[45] Dec. 3, 1974

[54] COMMUNICATION RECEIVING APPARATUS EMPLOYING SEVERAL SAMPLES OF BASEBOARD NOISE TO DETECT AN INCOMING SIGNAL AND TURN ON THE APPARATUS

[75] Inventor: Curtis A. Risley, Sharon, Mass.

[73] Assignee: GTE Sylvania Incorporated, Stamford, Conn.

[22] Filed: June 25, 1973

[21] Appl. No.: 373,412

[52] U.S. Cl. .................... 325/492, 325/325

[51] Int. Cl. .................... H04b 1/06

[58] Field of Search .......... 325/323, 325, 348, 478, 325/492; 328/260, 261

[56] References Cited

UNITED STATES PATENTS

| | | | |
|---|---|---|---|
| 3,769,593 | 10/1973 | Williams | 325/492 |

*Primary Examiner*—Benedict V. Safourek
*Assistant Examiner*—George H. Libman
*Attorney, Agent, or Firm*—David M. Keay; Elmer J. Nealon; Norman J. O'Malley

[57] ABSTRACT

Communication receiver employing squelch circuitry to turn on the receiver during receipt of an incoming signal. The RF and IF sections of the receiver are turned on periodically and the baseband noise originating in the IF limiter is sampled. The baseband noise pulses during the sample period are counted. If the number of pulses is less than a certain number, this information is stored as an indication that an incoming signal is present. If the certain number of pulses are counted during a period, an indication that an incoming signal is not present is stored. Based on several stored indications decision circuitry determines whether or not an incoming signal is present and causes operating power to be supplied to all sections of the receiver only if the determination is made that an incoming signal is present.

10 Claims, 3 Drawing Figures

COMMUNICATION RECEIVING APPARATUS EMPLOYING SEVERAL SAMPLES OF BASEBOARD NOISE TO DETECT AN INCOMING SIGNAL AND TURN ON THE APPARATUS

BACKGROUND OF THE INVENTION

This invention relates to communication equipment having reduced power consumption during standby operation. More particularly, it is concerned with squelch circuitry for automatically turning a communication receiver off in the absence of incoming signals in the bandpass of the receiver.

The use of squelch detection techniques for turning the audio section of a communication receiver on and off is well known in the communication art. In one conventional technique the envelope of the amplitude of the IF signal is detected before the signal enters the IF limiter. A large envelope indicates the presence of a signal and this information is utilized to cause the audio section to be turned on. In another technique the baseband noise which originates in the IF limiter or discriminator is detected. A lower noise level occurs during the presence of an incoming signal. This occurrence is detected and employed to cause the audio section to be turned on.

There are certain problems inherent in the use of these techniques. With the first technique a high ambient noise condition can indicate the presence of an incoming signal when none is present. In the second system with a highly modulated AM signal baseband noise can occur during the envelope trough falsely indicating that there is no incoming signal. In addition, the circuits for implementing these techniques are subject to drift with changing temperature, and since they are analog in nature they are not readily amenable to being fabricated with presently available integrated circuits.

SUMMARY OF THE INVENTION

Communication receiving apparatus in accordance with the present invention which operates in response to incoming signals makes use of the baseband noise which is generated within the IF section, specifically in the IF limiter, in the absence of incoming signals within the bandpass of the receiver. The existence of baseband noise which is generated within the IF section in the absence of an incoming signal is a known phenomenon. The density of the noise pulses drops abruptly with incoming signal strength. Apparatus in accordance with the invention includes radio receiver equipment having RF, IF, and audio sections. Baseband noise pulses are generated within a portion of the IF section. The apparatus also includes a power supply and a switching means which is coupled to the power supply and to the sections of the radio receiver equipment. A source of periodic clock pulses is coupled to the switching means.

The switching means operates during clock pulses to connect the power supply to the RF section and to the portion of the IF section from which the baseband noise is to be taken. A filter means is coupled to that portion of the IF section and passes pulses of baseband noise which are generated within the portion of the IF section while blocking signals at the IF frequency and noise generated in other portions of the radio receiver equipment. A digitizing means which is coupled to the filter means produces a pulse in response to each noise pulse of at least a predetermined amplitude which is passed by the filter means. A counting means coupled to the digitizing means and the source of periodic clock pulses counts the pulses from the digitizing means which occur during the period of a clock pulse. A latch means is coupled to the counting means and produces a first indication when the counting means counts less than a predetermined number of pulses during a clock pulse (an indication that there is an incoming signal present) and a second indication when the counting means counts the predetermined number of pulses during a clock pulse (an indication that there is no incoming signal present).

A storage means is coupled to the latch means for storing a plurality of indications from the latch means. A decision means is coupled to the storage means and also to the switching means. The decision means produces a first switching signal when in a first condition and a second switching signal when in a second condition. The decision means changes from the second condition to the first condition in response to a first predetermined combination of first and second indications being stored in the storage means, and changes from the first condition to the second condition in response to a second predetermined combination of first and second indications being stored in the storage means. The switching means operates during a first switching signal from the decision means to connect the power supply to all the sections of the radio receiver equipment whereby the radio receiver equipment operates to receive incoming signals. During a second switching signal from the decision means the switching means operates to disconnect the power supply from the radio receiver equipment whereby during a second switching signal the switching means connects the power supply to the RF section and the portion of the IF section only during clock pulses.

BRIEF DESCRIPTION OF THE DRAWINGS

Additional objects, features, and advantages of communication receiving apparatus in accordance with the present invention will be apparent from the following detailed discussion together with the accompanying drawings wherein.

DETAILED DESCRIPTION OF THE INVENTION

Figure 1:
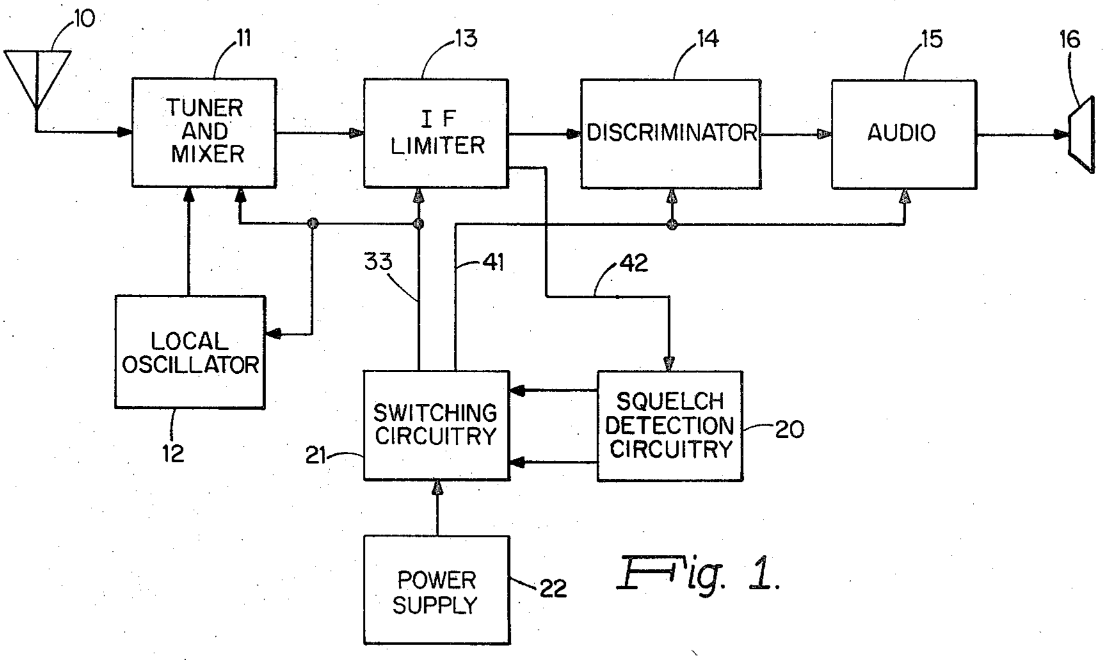
FIG. 1 is a block diagram of a conventional FM communication receiver employing squelch circuitry in accordance with the present invention.

The apparatus as illustrated in FIG. 1 includes a conventional FM receiver having an antenna 10, RF sections including a tuner and mixer 11, and a local oscillator 12. The IF sections include an IF limiter 13 and a discriminator 14. An audio section 15 is coupled to a speaker arrangement 16. The apparatus also includes squelch detection circuitry 20 which is connected to the IF limiter 13, and switching circuitry 21 which is connected to the squelch detection circuitry 20, a power supply 22, and various sections of the receiver.

Figure 2:
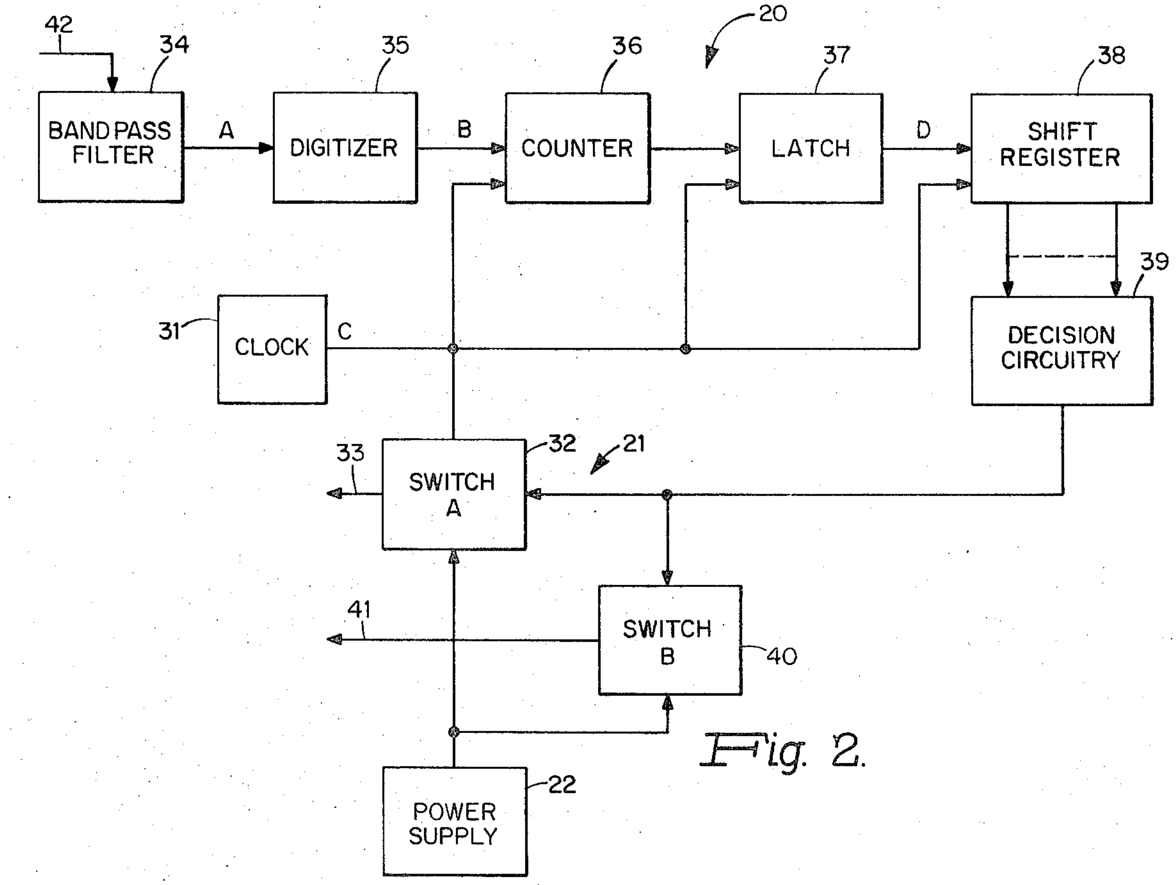
FIG. 2 is a detailed block diagram of the squelch circuitry and certain other portions of the apparatus illustrated in FIG. 1.

As illustrated in FIG. 2 the squelch detection circuitry 20 includes a clock 31 which is a source of periodic clock pulses. The clock pulses are rectangular pulses and their width is of the order of one-tenth the period of their repetition rate. The switching circuitry 21 includes a switch A 32 which is connected to the clock 31, the power supply 22, and the RF and IF sections of the receiver by way of a connecting line 33. The switch A 32 is caused to be closed by the pulses from the clock 31, and thus apply power to the RF and IF sections during clock pulses. The squelch detection circuitry 20 includes a bandpass filter 34 which is connected to the IF limiter 13 by line 42. The filter 34 passes baseband noise originating in the IF limiter 34 while blocking other noise originating in the receiver as well as IF signals. The output of the bandpass filter 34 is applied to a digitizer 35 which may for example, be a Schmitt trigger circuit. The digitizer 35 provides a pulse of uniform height for each pulse of baseband noise above the threshold level passed by the bandpass filter 34.

The output of the digitizer 35 is applied to a counter 36. The counter 36 is also connected to the clock 31. The counter 36 is enabled by a clock pulse from the clock 31 to count pulses received from the digitizer 35 during the period of each clock pulse. The counter 36 is reset on the trailing edge of each clock pulse. The counter 36 produces an output signal when the count in the counter reaches a certain predetermined number. The apparatus also includes a latch 37 connected to the output of the counter 36 and is enabled by pulses from the clock 31. The latch normally is in a first state and produces a first indication at its output. If when enabled by a clock pulse from the clock 31 the latch receives an output signal from the counter 36, it switches states and produces a second indication. The latch is reset to the first state on the trailing edge of each clock pulse.

The output of the latch 37 is applied to a shift register 38. The shift register 38 has a number of stages arranged in sequence for storing output indications from the latch 37. The shift register 38 is activated to shift data in succession along its stages by the trailing edges of clock pulses from the clock 31. Thus, the shift register 38 stores a number of indications from the latch 37. Each stage of the shift register has an output connection, and outputs are taken in parallel from all the stages to decision circuitry 39.

The decision circuitry 39 produces a first or a second switching signal at its output depending upon the conditions of the stages of the shift register 38. The output of the decision circuitry 39 is applied to the switch A 32 and a switch B 40 of the switching circuitry 21. The switch B 40 is connected to the power supply 22 and by way of connection 41 to the discriminator 14 and audio section 15 of the communication receiver. When the decision circuitry 39 decides from the indications stored in the shift register that a signal is present, it produces a first switching signal which causes both switch A 32 and switch B 40 to close thereby supplying operating power to all of the sections of the receiver. When the decision circuitry 39 determines from the indications in the shift register stages 38 that a signal is not present, switch B 40 remains open and switch A 32 is closed only during clock pulses from the clock 31.

Figure 3:
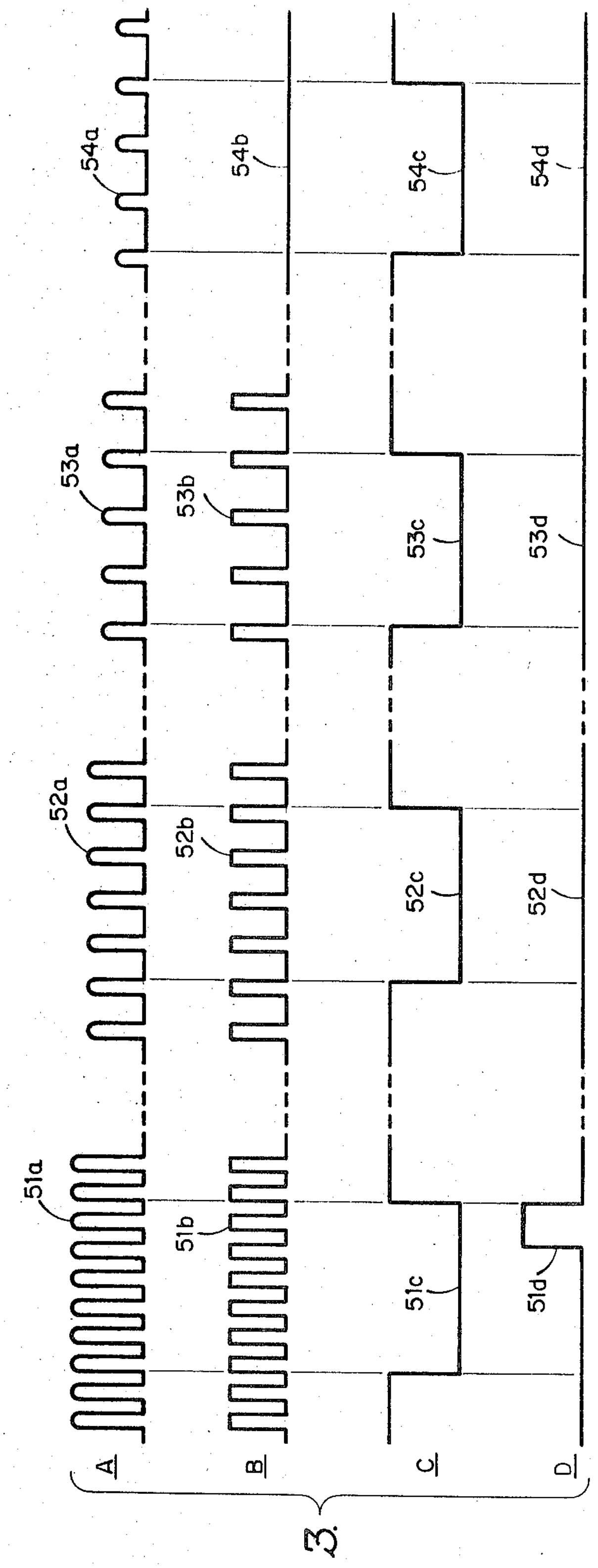
FIG. 3 is a set of curves illustrating typical voltages occurring at particular points of the circuitry of FIG. 2 under various conditions.

Detailed operation of the apparatus of FIGS. 1 and 2 may best be understood with reference to the voltage curves of FIG. 3 which indicate voltages at various points A, B, C, and D in FIG. 2 under various conditions. When the apparatus is turned on, power is supplied to the various elements of the squelch detection circuitry 20 and switching circuitry 21 (connections not shown). During each clock pulse from the source of clock pulses 31 switch A 32 closes supplying power to the RF section and IF limiter by way of line 33.

As explained previously, the bandpass filter 34 is connected to the IF limiter, and during each clock pulse passes baseband noise originating in the IF limiter. In order to pass baseband noise originating in the IF limiter and block both the lower frequency noise passing through the crystal filter of the receiver and also the higher frequency IF signals, the bandpass of the filter may be from 15 to 30 KHz. The baseband noise pulses 51*a*, 52*a*, 53*a*, and 54*a* as shown in FIG. 3 which occur at point A of FIG. 2 vary in density in direct proportion to the incoming signal amplitude, and tend to disappear abruptly with incoming signals of large amplitude in accordance with well-known phenomena. For purposes of illustrating the manner of operation of the apparatus, the curves 51*a*, 52*a*, 53*a*, and 54*a* of FIG. 3 illustrate four different conditions of noise pulses passed by the bandpass filter 34 during clock pulses 51*c*, 52*c*, 53*c*, and 54*c*, each set being less dense than the preceding.

The output of the bandpass filter 34 is applied to the digitizer 35 which, as mentioned previously, may be a conventional Schmitt trigger circuit. The digitizer 35 produces a rectangular pulse 51*b*, 52*b*, and 53*b* at point B for each noise pulse from the filter which exceeds the threshold level of the digitizer 35. In the example given the noise pulses 54*a* during the fourth clock pulse 54*c* are below the threshold of the digitizer 35 producing no pulses on voltage curve 54*b*.

In addition to causing power to be applied to certain portions of the receiver, the clock pulses also enable the counter 36. The counter counts the number of pulses during each clock pulse and is reset on the trailing edge of each clock pulse. In the present example the counter 36 is arranged to produce an output signal (a positive going voltage) when 5 pulses are counted.

The latch 37 which is also enabled during each clock pulse changes state to produce a positive signal when the counter 36 reaches a count of 5. The output of the latch 37 at point D is illustrated by curves 51*d*, 52*d*, 53*d*, and 54*d*. The latch 37 is reset to its normal state on the trailing edge of each clock pulse.

As illustrated in the curves of FIG. 3 the first set of pulses 51*b* applied to the counter 36 cause the counter to count to 5 during the first clock pulse 51*c* causing the latch 37 to change state and produce a positive pulse 51*d*. On the trailing edge of the first clock pulse 51*c*, which resets both the counter 36 and latch 37, the voltage at the latch output sets the first stage of the shift register 38 thereby storing an indication that a count of 5 was reached. This is an indication that no incoming signal is present. All data stored in the shift register is shifted one stage along the sequence of stages on the trailing edge of the clock pulse with the data in the last stage being removed. Since the number of pulses 52*b* and 53*b* during the second and third clock pulses 52*c* and 53*c* are less than 5 and there are no pulses 54*b* during the fourth clock pulse 54*c*, there are no output signals from the counter 36 or latch 37 as shown in curves 52*d*, 53*d*, and 54*d* during these clock pulses. Thus, the first stage of the shift register 38 is in the reset condition after each of these clock pulses, storing indications that an incoming signal is present.

The decision circuitry 39 is connected to the output connections from each of the stages of the shift register 38. For illustrative purposes it is assumed that the shift register contains four stages, and the decision circuitry 39 is arranged to provide a first switching signal indicating the presence of an incoming signal whenever any one of the stages of the shift register is in the reset condition. A second switching signal indicating the absence of an incoming signal is produced by the decision circuitry only when all four stages of the shift register are in the set condition. In order to implement these decision rules only a single 4-input OR gate is required for the decision circuitry. For more complex decision rules a more complicated logic arrangement is required.

When the second switching signal from the decision circuitry 39 indicating no incoming signal is produced by the decision circuitry 39, both switch A 32 and switch B 40 are opened. Switch A 32, however, is closed during each clock pulse from the clock 31. During the clock pulses switch A 32 connects the power supply 22 to the RF section and to the IF limiter thus sampling the baseband noise to obtain an indication of the presence or absence of an incoming signal for storing in the shift register 38.

When the decision circuitry 39 produces the first switching signal indicating the presence of an incoming signal, both switch A 32 and switch B 40 are closed supplying power to all the sections of the receiver. During the time the receiver is operating the baseband noise is continuously sampled by the clock pulses which enable the counter 36 and latch 37. The indications of the presence or absence of an incoming signal are stored in the shift register 38. Depending upon the combination of indications stored in the stages of the shift register 38, the decision circuitry 39 causes the receiver to operate or to be in standby condition.

Thus, the apparatus as illustrated includes a digital squelch circuit which is inherently stable with temperature and not prone to faulty operation. Since several indications rather than just one are used in making decisions, the apparatus is not subject to momentary false indications caused by external noise pulses or overmodulation. In addition, many of the elements of the squelch detection circuitry are available as digital logic integrated circuits which require very little space and very little operating power. The switches A and B 32 and 40 may be simple transistor switches of conventional type.

As a further example the width of each clock pulse desirably may be of approximately one-tenth the period of the clock pulse repetition rate. The width of the clock pulses may be of the order of between 2 and 5 milliseconds and the period of the clock repetition rate between 25 and 50 milliseconds. These relationships provide low power loss during standby while avoiding loss of any information at the beginning of transmission of a signal.

While there has been shown and described what is considered a preferred embodiment of the present invention, it will be obvious to those skilled in the art that various changes and modifications may be made therein without departing from the invention as defined by the appended claims.

What is claimed is:

1. Communication receiving apparatus which operates in response to incoming signals comprising radio receiver equipment including RF, IF, and audio sections, said IF section having a portion generating pulses of baseband noise in the absence of incoming signals;

a power supply;

switching means coupled to the power supply and the sections of the radio receiver equipment;

a source of periodic clock pulses;

said switching means being coupled to the source of periodic clock pulses and being operable during clock pulses therefrom to connect the power supply to the RF section and said portion of the IF section of the radio receiver equipment;

filter means coupled to said portion of the IF section and operable to pass pulses of baseband noise generated within said portion while blocking signals at the IF frequency and noise generated in other portions of the radio receiver equipment;

digitizing means coupled to said filter means and operable to produce a pulse in response to each noise pulse of predetermined amplitude passed by the filter means;

counting means coupled to the digitizing means and the source of periodic clock pulses and operable to count the pulses from the digitizing means occurring during a clock pulse;

latch means coupled to the counting means and operable to produce a first indication when the counting means counts less than a predetermined number of pulses during a clock pulse and a second indication when the counting means counts the predetermined number of pulses during a clock pulse;

storage means coupled to the latch means for storing a plurality of indications from said latch means; and decision means coupled to the storage means and to the switching means for producing a first switching signal when in a first condition and a second switching signal when in a second condition, said decision means being operable to change from the second condition to the first condition in response to a first predetermined combination of first and second indications being stored in said storage means and being operable to change from the first condition to the second condition in response to a second predetermined combination of first and second indications being stored in said storage means;

said switching means being coupled to said decision means and being operable during a first switching signal to connect the power supply to all the sections of the radio receiver equipment whereby the radio receiver equipment operates to receive incoming signals, said switching means being operable during a second switching signal to disconnect the power supply from the radio receiver equipment whereby during a second switching signal the switching means connects the power supply to the RF section and said portion of the IF section only during clock pulses.

2. Communication receiving apparatus in accordance with claim 1 wherein said storage means includes a shift register having an input connection connected to the latch means and a plurality of stages arranged in series, each stage having a first state and a second state and an output connection, and being in the first state to store a first indication and the second state to store a second indication; and said decision means is connected to the output connections from the stages of the shift register.

3. Communication receiving apparatus in accordance with claim 2 wherein said counting means is enabled to count pulses from the digitizing means during each periodic clock pulse and is operable to be reset on the trailing edge of each periodic clock pulse, said counting means being operable to produce an output signal when said predetermined number of pulses have been counted;

said latch means being coupled to the source of periodic clock pulses and having first and second states and being operable to produce a first indication when in a first state and a second indication when in a second state, said latch means being enabled to be triggered from the first state to the second state during each periodic clock pulse in response to an output signal from the counting means and being operable to be reset to the first state on the trailing edge of each periodic clock pulse; and said shift register being operable to receive each indication from said latch means in the first stage thereof and shift the stored indications in sequence along the stages of the shift register on the trailing edge of each periodic clock pulse.

4. Communication receiving apparatus in accordance with claim 3 wherein said IF section of the radio receiver equipment includes an IF limiter and a discriminator;

said filter means is coupled to the IF limiter; and said switching means includes a first portion coupled to the power supply, the source of periodic clock pulses, the decision means, and the RF section and IF limiter of the radio receiver equipment, said first portion of the switching means being operable during a first switching signal from the decision means to connect the power supply to the RF section and the IF limiter, and being operable during a second switching signal from the decision means and a clock pulse to connect the power supply to the RF section and the IF limiter; and a second portion coupled to the power supply, the decision means, and the discriminator and audio section of the radio receiver equipment and operable during a first switching signal from the decision means to connect the power supply to the discriminator and audio section.

5. Communication receiving apparatus in accordance with claim 4 wherein said digitizing means includes a Schmitt trigger circuit.

6. Communication receiving apparatus in accordance with claim 1 wherein the width of each clock pulse is of the order of one-tenth the period of the clock pulse repetition rate.

7. Communication receiving apparatus in accordance with claim 6 wherein the width of each clock pulse is between 2 and 5 milliseconds; and the period of the clock pulse repetition rate is between 25 and 50 milliseconds.

8. Apparatus responsive to pulses of electromagnetic energy comprising filter means adapted to receive electromagnetic energy and operable to pass electromagnetic energy of predetermined frequencies;

digitizing means coupled to said filter means for generating a pulse in response to each pulse of electromagnetic energy of the predetermined frequencies and of predetermined amplitude;

counting means coupled to said digitizing means and operable to count pulses from the digitizing means for a predetermined period of time;

latch means coupled to said counting means and operable to produce a first indication when the counting means counts less than a predetermined number of pulses within said predetermined period of time and a second indication when the counting means counts said predetermined number of pulses within said predetermined period of time;

storage means coupled to said latch means for storing a plurality of indications from said latch means; and decision means coupled to said storage means and having first and second output conditions, said decision means being operable to change from the second output condition to the first output condition in response to a first predetermined combination of first and second indications being stored in said storage means and being operable to change from the first output condition to the second output condition in response to a second predetermined combination of first and second indications being stored in said storage means;

said storage means including a shift register having an input connection connected to the latch means and a plurality of stages arranged in series, each stage having a first state and a second state and an output connection, and being in the first state to store a first indication and the second state to store a second indication; and said decision means being connected to the output connections from the stages of the shift register.

9. Apparatus in accordance with claim 8 including a source of periodic clock pulses for producing clock pulses of width equal to said predetermined period of time;

and wherein said counting means is enabled to count pulses from the digitizing means during each periodic clock pulse and is operable to be reset on the trailing edge of each periodic clock pulse, said counting means being operable to produce an output signal when said predetermined number of pulses have been counted;

said latch means having first and second states and being operable to produce a first indication when in a first state and a second indication when in a second state, said latch means being enabled to be triggered from the first state to the second state during each periodic clock pulse in response to an output signal from the counting means and being operable to be reset to the first state on the trailing edge of each periodic clock pulse; and said shift register being operable to receive each indication from said latch means in the first stage thereof and shift the stored indications in sequence along the stages of the shift register on the trailing edge of each periodic clock pulse.

10. Apparatus in accordance with claim 8 wherein said digitizing means includes a Schmitt trigger circuit.

* * * * *